Nov. 30, 1948.     H. C. BERKELEY     2,454,960
ICE TRAY
Filed July 3, 1944                2 Sheets-Sheet 1
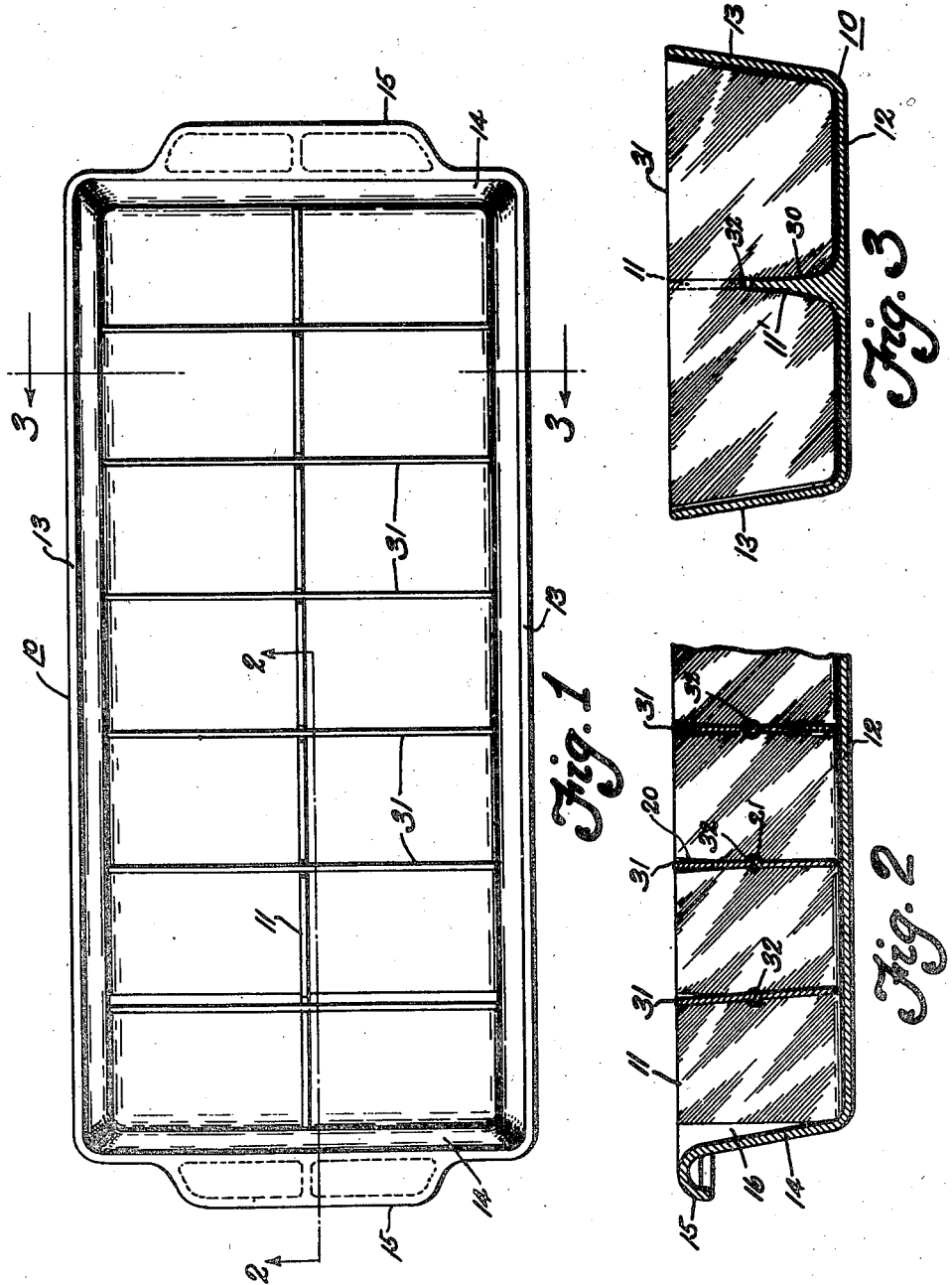
INVENTOR
HARRISON C. BERKELEY
BY
Spencer Hardman & Fehr
his ATTORNEYS Nov. 30, 1948.                H. C. BERKELEY                2,454,960
                                 ICE TRAY
Filed July 3, 1944                                      2 Sheets-Sheet 2
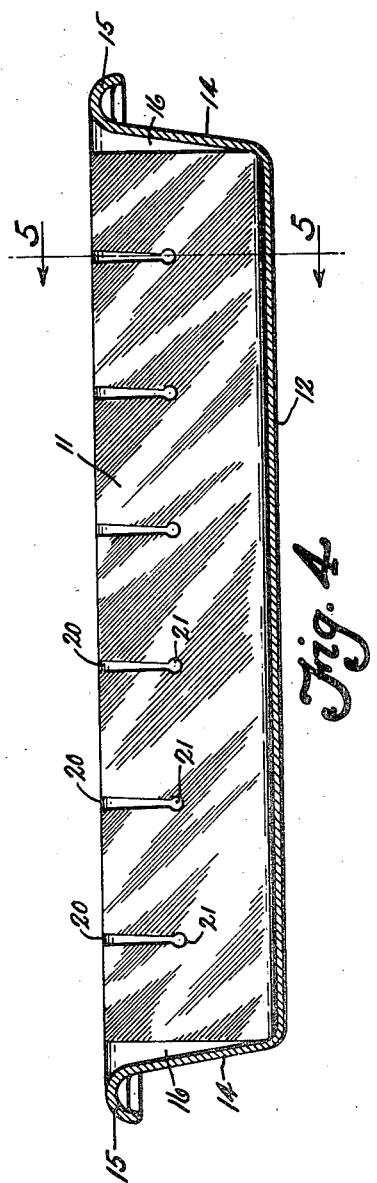
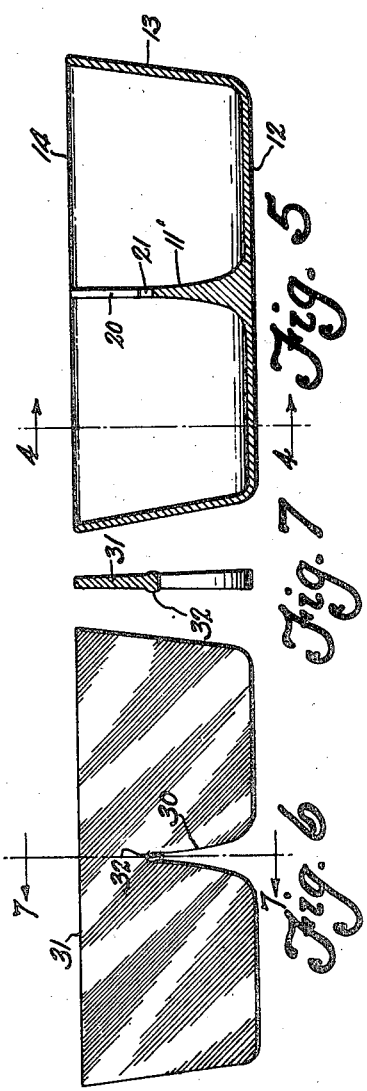
INVENTOR
HARRISON C. BERKELEY
BY
Spencer Hardman & Fehr
his ATTORNEYS Patented Nov. 30, 1948

2,454,960

UNITED STATES PATENT OFFICE 2,454,960

ICE TRAY

Harrison C. Berkeley, Dayton, Ohio, assignor to General Motors Corporation, Detroit, Mich., a corporation of Delaware Application July 3, 1944, Serial No. 543,331

8 Claims. (Cl. 62—108.5)

This invention relates to freezing trays of such size as to be adapted for use in the freezing compartments of ordinary household mechanical refrigerators.

An object of this invention is to provide improvements in freezing trays molded from a somewhat flexible but self-sustaining plastic material as distinguished from such trays molded from flexible rubber or similar material whose physical characteristics readily permit any desired degree of distortion and stretching.

Freezing trays molded from such readily flexible and stretchable material as rubber or the like do not present the same problems as those to which this present invention is addressed, due to the fact that presently known molded plastic materials suitable for ice trays can withstand only a relative limited degree of repeated distortion. For instance, a flexible rubber freezing tray can withstand being turned inside out, and can be repeatedly severely distorted in any desired manner and materially stretched to enlarge the ice block compartments, without causing a break in the flexible rubber walls.

Hence an object of this invention is to provide a freezing tray structure having only slightly flexible but self-sustaining walls, and which when manually distorted to a slight degree when filled with hard-frozen ice blocks will loosen the frozen bond of the ice blocks and permit them to be dumped out or easily picked out with the fingers.

Another object is to provide such an ice tray unitary structure having the molded container pan and at least one of the grid walls integrally molded thereto while the other grid walls have their edges detached wholly or partially from the pan in such a way as to facilitate the movement of said walls relative to the pan.

Another object is to provide a molded plastic unitary grid and pan structure wherein only one of the grid walls is integrally molded to the pan bottom and other grid walls are assembled directly or indirectly to said integrally molded wall and have their marginal edges free to move relative to the pan.

Another object is to provide a molded plastic ice tray wherein the pan and grid form a unitary structure which remains unitary during the normal operations of freezing and ejecting the ice cubes, nevertheless wherein many of the grid walls have their marginal edges wholly or partially detached from the pan in such manner as to permit movement relative to the adjacent pan wall.

Another object is to provide a molded plastic ice tray wherein the pan and grid form a unitary structure, nevertheless wherein all of the grid walls are detached wholly or partially from the adjacent side walls of the pan in such manner as to permit movement relative thereto.

Another object is to provide a molded plastic ice tray wherein one of the grid walls is permanently secured to the pan bottom while other grid walls are retained in internesting relationship with said permanently secured wall by joints which permit a slight relative movement between the joined walls.

Further objects and advantages of the present invention will be apparent from the following description, reference being had to the accompanying drawings wherein a preferred embodiment of the present invention is clearly shown.

In the drawings:

Fig. 1 is a plan view of a freezing tray made according to this invention.

Fig. 2 is a partial longitudinal section taken on the line 2—2 of Fig. 1.

Fig. 3 is a cross section taken on line 3—3 of Fig. 1.

Fig. 4 is a longitudinal section of the container pan and one longitudinal grid wall, all integrally molded together.

Fig. 5 is a cross section taken on line 5—5 of Fig. 4.

Figs. 6 and 7 are detail views of the preferred form of separately made cross partitions.

Similar reference characters refer to similar parts throughout the several views.

Numeral 10 designates the container pan 10 which is molded in one piece from any suitable moldable plastic compound having the desired characteristics. The longitudinal wall 11 is joined integrally to the pan bottom 12 and is preferably tapered in section by being thicker at its bottom edge than at its top edge. The side walls 13 and end walls 14 of pan 10 are inclined outwardly, as clearly illustrated in Figs. 2 and 3, in order to greatly facilitate the flexing movement of these pan walls relative to the frozen contents of the tray during the ice-ejection operation to be later described herein. All walls of pan 10 meet with smooth well-rounded corners in order to facilitate the loosening of the frozen ice blocks therefrom. Also the central longitudinal partition wall 11 preferably has a relatively thick section at its base and is rounded off to a gradually tapering cross section (as best shown in Fig. 5). The upper margin of wall 11 preferably is quite thin and flexible, however the lower quite thick portion 11' of longitudinal wall 11 provides what may be termed a sustaining back-bone for the flexible tray structure. Thus the central portion of the pan bottom 12 together with the integrally molded thick portion 11' form a sufficiently rigid T-shaped cross section to render the tray self-supporting when it is filled with water and held at only one end thereof. This will permit the side walls 13, end walls 14, and nearly the full area of the bottom wall 12 to be made relatively thin and flexible, in order to greatly facilitate a twisting distortion of the entire tray about its central longitudinal axis as later described herein. Preferably the upper edges of side walls 13 do not have the usual outwardly turned flanges thereon, such omission being for the purpose of increasing their flexibility and thus again facilitating the distortion of the pan. The upper edges of one or both of the end walls 14 may have integrally molded curved flanges 15 thereon to serve as handles for the tray. However these flanges 15 do not extend the full length of end walls 14, but stop short of the curvature at the four corners of the pan in order not to interfere with the flexing distortion of the pan adjacent the four corners thereof.

The longitudinal wall 11 even though molded integral with the pan bottom 12 is wholly or partially detached from the adjacent end walls 14 in such manner as to permit relative movement between end walls 14 of the pan and the detached edges of center wall 11. Figs. 2 and 4 show clearance gaps 16 between the ends of center wall 11 and the end walls 14. The small necks of ice which fill these gaps 16 are easily broken when the entire tray with its frozen contents is given a twisting distortion, hence the end walls 14 are substantially free to move relative to center wall 11 during any twisting distortion of the tray.

Longitudinal wall 11 has a series of tapered slots 20 molded therein and adapted to receive and retain in assembled relationship the separate cross walls 31. These separate cross walls 31 are inserted in place in slots 20 preferably by being forced into their internesting relationship with the longitudinal wall 11 to form ice block compartments, but still leaving all the marginal edges of said cross walls detached from and free to move relative to the bottom 12 and side walls 13 of the pan. Cross walls 31 each have an upwardly extending tapered slot 30 therein within which the thick lower portion 11' of longitudinal wall 11 extends with a sliding fit.

Each tapered section cross wall 31 may be retained in place by a pressed fit between only the lower portion of the slot 20 and the corresponding central portion of the cross wall, but otherwise each cross wall is preferably freely distortable along the side surfaces of the longitudinal wall 11. Such a pressed fit over only a short vertical distance at the bottom of slot 20 will still leave all other portions of each cross wall 31 free to flex and so move relative to longitudinal wall 11 when the tray and its frozen contents is given a twisting distortion.

However, the preferred method of retaining cross walls 31 within the slots 20 in the longitudinal wall 11 is as follows. Each tapered slot 20 is provided with a slightly undercut recess 21 at its bottom, as clearly illustrated in Fig. 4. Each cross wall 31 is provided with a small bump 32 which fits fairly closely nevertheless loosely within its corresponding recess 21 (see Figs. 5, 6 and 7). These bumps 32 are of such dimensions that they must be pressed down with deliberate force thru the narrowest neck of tapered slots 20 and thereafter have a fairly loose fit within recesses 21. After the cross walls 31 are thus assembled upon longitudinal wall 11 each cross wall 31 will be sufficiently loose as to be capable of a very slight bodily movement in any direction relative to longitudinal wall 11 due to some slight movement (perhaps only several thousandths of an inch) of the bumps 32 in recesses 21. However the cross walls will not fall out when the tray is inverted, nor will they be normally knocked out by careless handling. In other words, the cross walls 31 will be permanently assembled in interlocking relationship with longitudinal wall 11, and can be removed only by being carefully and deliberately pulled directly upward with a force at least as great as the force originally required to press the bumps 32 down thru the narrowest necks of slots 20. The cross walls 31, when thus assembled, may each independently swing several degrees in a fore and aft direction about the bumps 32 as a pivot. In Fig. 2, the cross wall at the left is shown tilted toward the left several degrees while the cross wall at the right is shown in dotted lines as similarly tilted in the opposite direction. Even though each cross wall 31 be quite loose its possible tilting movement will be positively limited to only several degrees by the taper of slot 20 in longitudinal wall 11.

The relatively thick portion 11' of center wall 11 will maintain the cross walls 31 in their normal freezing position before the water is frozen, that is, substantially perpendicular to the central plane of the longitudinal wall 11, as seen in plan view in Fig. 1. This perpendicularity is positively maintained because of the substantial thickness of the base of lower portion 11' and the fairly close (even though loose) fit of the correspondingly shaped slots 30 of the cross walls therewith. If any cross wall 31 be urged to swing away from such perpendicular position (as viewed in plan in Fig. 1) the lower edges of its wide tapered slot 30 obviously will immediately engage and press upon the adjacent surfaces of the thick lower portion 11' and so substantially prevent such swinging of the cross wall.

The cross walls 31 are preferably slightly tapered in section so as to be of slightly greater thickness at their bottom edges than at their top edges (see Fig. 7) in order to permit the ice blocks to more easily drop out after they have been loosened by the manual distortion of the tray when filled with its frozen contents. However it is not absolutely necessary to use tapered-section cross walls with this invention. In Fig. 2 substantially non-tapered cross walls are illustrated.

The operation of this ice tray may be as follows. When the tray is filled with water, or other liquid to be frozen, in any careless manner all the compartments will be filled to the same level due to the fact that water can readily pass both under and around all the edges of the cross walls 31 and also thru the gaps 16 at both ends of longitudinal wall 11. The filled tray may then be carried by its handles 15 and placed within a freezing chamber of a refrigerator. Sufficient rigidity is provided by the above-described T-shaped back-bone so that the water-filled tray will not be too flexible for ordinary handling thereof. Even though the walls of the container pan may be quite flexible the water-filled tray will still be self-supporting and will require no metal reinforcements or any sort of supporting carrier.

After the ice is hard frozen the tray may be removed from the refrigerator, and by giving the entire tray and contents a slight twisting distortion all the ice blocks will be loosened both from the pan 12 and all the grid walls, after which the ice blocks may be dumped out by inverting the tray or the loosened blocks may be otherwise removed therefrom. The tray may be held in inverted position during such twisting distortion thereof in order to permit the ice blocks to be more readily worked out of the compartments and to drop out individually as soon as may be. Thus if only several ice blocks are wanted at the time it will be unnecessary to remove all of them from the tray.

Preferably the filled tray is grasped at its opposite ends with the two hands in order to give it a slight twisting distortion. Since the peripheral walls of the pan are flexible and are substantially free to move relative to any grid wall, these pan walls may be readily flexed free from any frozen bond to the ice, this because any twisting distortion of the pan as a whole will readily distort all these pan walls sufficiently to peel them from the ice. Only a very slight twisting distortion of the pan is required. The longitudinal wall 11 is molded integrally to the pan bottom, hence the twisting distortion of the pan is normally transmitted directly to wall 11 which is thereby slightly twisted. Since all the cross walls 31 are individually free to move slightly relative to both the pan and wall 11, these cross walls may be caused to move in various directions by said twisting distortion. Thus there will be no fixed corners at the intersections of the grid walls wherein the ice blocks will firmly stick. An extremely slight bodily movement between the grid walls at any intersection thereof will very materially facilitate the loosening of the ice blocks.

The moldable plastic compound suitable for molding the pan and grid parts of this tray may use as its chief ingredient any one of the following presently known materials: ethyl-cellulose, polythene, thermoplastic polystyrene, thermosetting polystyrene. These materials are given merely as examples, and, of course this invention is not dependent upon the use of these particular examples. However in any moldable compound used it is important that there be some ingredient which will render the molded surface of the container pan and grid walls water-repellent, that is, provide a surface to which a water film will not adhere. Such a surface will greatly facilitate the loosening of the ice blocks from the device of this invention because the frozen bond between the ice and its contacting walls will be merely a mechanical bond rather than a bond due to adherence between molecules. Since the walls of both the pan and grid can be readily molded quite hard and smooth and at the same time water-repellent there will be a minimum mechanical bond between the hard frozen ice blocks and their confining walls. Such a minimum mechanical bond is not obtainable with flexible soft rubber walls, because when ice freezes rapidly in contact with such rubber walls it causes irregular local bulges in the rubber walls and thus interlocks therewith.

While the embodiments of the present invention as herein disclosed, constitute a preferred form, it is to be understood that other forms might be adopted, all coming within the scope of the claims which follow.

What is claimed is as follows:

1. A unitary molded plastic freezing tray, comprising: an integrally molded container pan and a longitudinal partition having its bottom edge molded to the pan bottom but having its end edges substantially detached from the end walls of said pan whereby to increase the flexing distortability of this integrally molded unit, a series of spaced separate cross partitions intersecting said longitudinal partition and retained substantially in normal freezing position by an interlocking relationship therebetween and thereby forming a unitary pan and grid structure, the edges of said cross partitions being movable relative to the adjacent pan walls whereby to increase the distortability of the unitary pan and grid structure to facilitate the removal of the frozen ice blocks by manual flexing.

2. A flexible plastic freezing tray for freezing a plurality of small ice blocks, said tray comprising: a flexible pan and a flexible longitudinal partition integrally molded from plastic material, said longitudinal partition being integrally molded to said pan at its bottom edge and having a series of spaced openings spaced along its length, a series of separate flexible cross partitions retained against accidental removal within said spaced openings in said longitudinal partition to form a grid in said pan, the end edges of said longitudinal partition and end edges of said cross partitions being substantially detached from the adjacent pan walls, whereby to increase the distortability of the unitary pan and grid structure.

3. A flexible plastic freezing tray for freezing a plurality of small ice blocks, said tray comprising: a flexible pan and a flexible longitudinal partition integrally molded from plastic material, said longitudinal partition being integrally molded to said pan at its bottom edge and having a series of spaced openings spaced along its length, a series of separate flexible cross partitions each having an internesting relationship with said openings in said longitudinal partition to form a grid in said pan, the end edges of said longitudinal partition and also the end edges of said cross partitions being substantially detached from the adjacent pan walls, whereby to greatly increase the distortability of the unitary structure.

4. A flexible plastic freezing tray for freezing a plurality of small ice blocks, said tray comprising: a flexible pan and a flexible longitudinal partition integrally molded from plastic material, said longitudinal partition being integrally molded to said pan at its bottom edge and having a series of spaced openings spaced along its length, a series of separate flexible cross partitions each retained substantially in its normal freezing position within said spaced openings by an interlocking relationship therebetween, the end edges and bottom edges of said cross partitions being detached from the adjacent pan walls, whereby to increase the distortability by manual flexing of the unitary pan and partition walls to facilitate the removal of the frozen ice blocks.

5. A manually distortable freezing tray comprising: a container pan and a main grid partition therein for dividing the contents of said pan, said pan and main partition being an integrally molded unit of plastic material, said integrally molded unit having such rigidity as to be inherently self-supporting when filled with water but having sufficient distortability to be capable of being manually twisted a limited degree to loosen therefrom the frozen bond of its ice contents, said main partition having a series of slots therein spaced along its length, and a series of separate slightly flexible cross partitions extending transversely to said main partition and each individually retained in one of said slots in such manner as to permit each cross partition to move slightly due to the pressure of the ice contents thereupon when said molded unit is distorted to loosen the frozen ice contents.

6. A manually distortable freezing tray comprising: a container pan and a main grid partition therein for dividing the contents of said pan, said pan and main partition being an integrally molded unit of plastic material, said main grid partition having its bottom edge integrally molded to the pan bottom but having its end edges detached from the adjacent upstanding walls of said pan, said unit having such inherent stiffness as to be inherently self-supporting when filled with water but having sufficient distortability to be capable of being manually distorted to loosen therefrom the frozen bond of its ice contents, and a series of separate cross partitions intersecting said main partition and individually yieldably retained in freezing position by an interlocking relationship with said main partition which will permit a slight individual movement of each cross partition due to the pressure of the ice contents thereupon when the tray is manually distorted as a whole to loosen the frozen contents therefrom.

7. A slightly flexible freezing tray capable of being manually distorted to loosen the bond of its frozen contents therefrom, comprising: an integrally-molded unit formed of plastic material consisting of a container pan and a single main partition extending substantially the length of said pan, said main partition having its bottom edge molded integral with the pan bottom but having its end edges detached from the adjacent upstanding walls of said pan, said integrally molded pan and main partition providing the structural strength of the tray as a whole and having sufficient rigidity as to be inherently self-supporting when the pan is filled with water, and a plurality of separate cross partitions intersecting said main partition and individually yieldably mounted thereupon.

8. A manually distortable freezing tray comprising: a manually-distortable integrally-molded plastic unit comprising a container pan and a single main partition therein integrally molded to the pan bottom, said main partition having a series of slots therein spaced along its length, and a series of separate slightly flexible cross partitions inserted in said slots in said main partition, each cross partition being loosely retained in its slot in said main partition by an interlocking relationship with said slot which prevents said cross partitions from falling out of said slots by gravity when the tray is inverted.

HARRISON C. BERKELEY.

REFERENCES CITED

The following references are of record in the file of this patent:

UNITED STATES PATENTS

| Number | Name | Date |
| --- | --- | --- |
| 1,746,587 | Hanley | Feb. 11, 1930 |
| 1,873,287 | Chilton | Aug. 23, 1932 |
| 1,889,481 | Kennedy, Jr. | Nov. 29, 1932 |
| 1,912,065 | Buchanan et al. | May 30, 1933 |
| 2,027,754 | Smith | Jan. 14, 1936 |
| 2,045,371 | Roberts | June 23, 1936 |
| 2,297,558 | Hintze et al. | Sept. 29, 1942 |
| 2,313,932 | Gerard et al. | Mar. 16, 1943 |